UNITED STATES PATENT OFFICE.

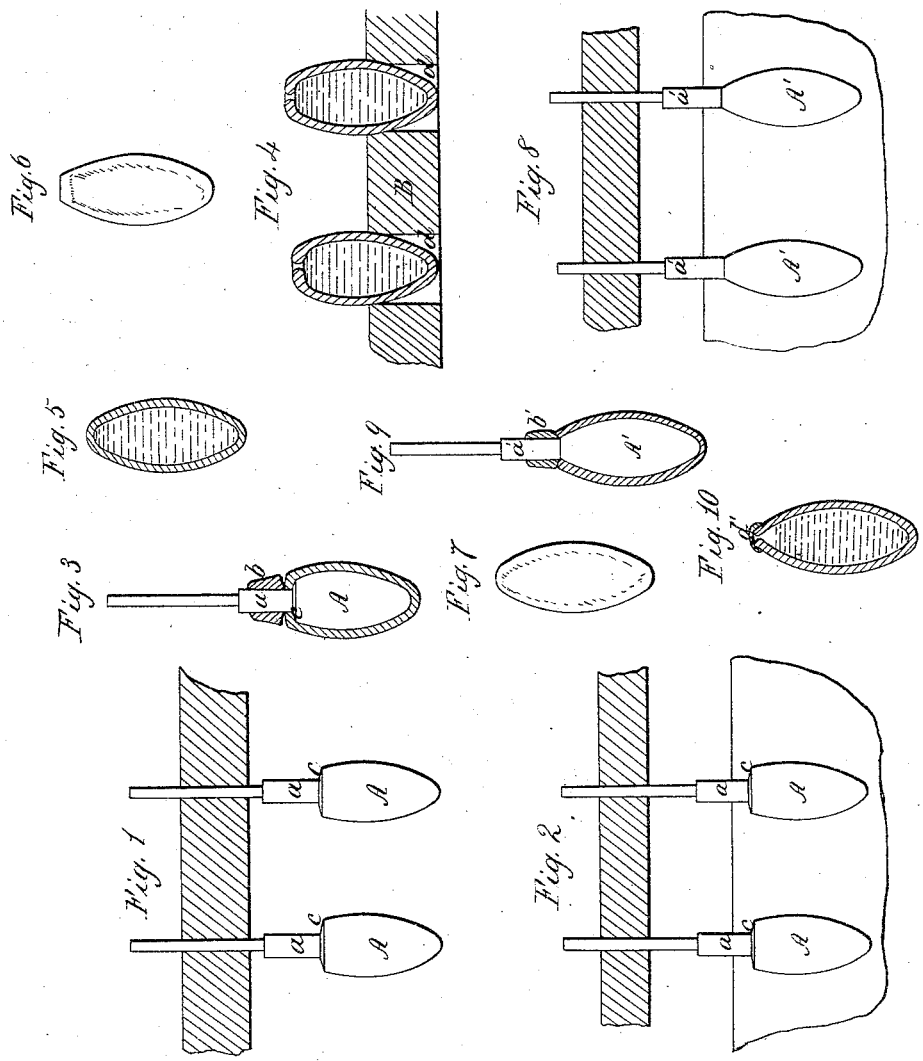

PIERRE CAUHAUPÉ, OF NEW LEBANON, NEW YORK.

IMPROVEMENT IN MAKING CAPSULES OF COPAIBA.

Specification forming part of Letters Patent No. 33,983, dated December 24, 1861.

*To all whom it may concern:*

Be it known that I, PIERRE CAUHAUPÉ, of New Lebanon, in the county of Columbia and State of New York, have invented certain new and useful Improvements in the Manufacture of Capsules of Copaiba; and I do hereby declare that the following is a full, clear, and exact description of the same, reference being had to the accompanying drawings, forming part of this specification, in which—

Figure 1 represents a side elevation of my improved mold. Fig. 2 is a similar elevation of the same in the act of being dipped into the composition from which the capsules are made. Fig. 3 is a sectional elevation of the improved mold with the capsule on. Fig. 4 is a vertical section of the closing-frame with two capsules inserted, representing them before being closed. Fig. 5 is a vertical central section of my capsule closed. Fig. 6 is a side elevation of the same just as it comes from the mold and before being closed. Fig. 7 is a side elevation of the same after it is finished. Figs. 8, 9, and 10 represent the old method of manufacturing the capsules.

Similar letters of reference in all the figures indicate corresponding parts.

The first part of my invention relates to an improvement in the molds over which the capsules are formed; and it consists in turning the upper ends of said molds down in such a manner that a shoulder is produced which considerably facilitates the closing of the capsules formed over said molds.

The second part of my invention relates to an improved mode of closing up or sealing the capsules by dipping them after they are filled with copaiba into the same composition from which they are made in such a manner that capsules are produced which present a perfectly smooth and seamless surface.

To enable those skilled in the art to make and use my invention, I will proceed to describe it with reference to the drawings.

The capsules of copaiba are generally formed by means of molds A', such as represented in Figs. 8 and 9. These molds are regular ellipsoids made of tin or some other suitable material, and they are attached to stems a', which form the handles during the operation of dipping.

The composition from which the capsules are formed consists, chiefly, of glycerine mixed with certain other ingredients in such a manner that it is easily rendered fluid by the application of heat or of some solvent, and that it hardens or dries readily when exposed to the open atmosphere. When the composition is hard, it has a transparent glue-like appearance, and in this state one capsule after the other is removed from the mold. To effect this purpose, it is necessary to cut the upper end or neck b', Fig. 9, from the lower portion of the capsule just at the point where the mold joins the stem, and the capsule can now be forced out over the mold, its mouth being capable of expanding sufficiently to pass over the central portion of the mold. The upper edge of the capsule thereby becomes ragged and uneven, and it is difficult to close it. This difficulty I have overcome by turning my molds A down, as shown in Figs. 1, 2, and 3, so that a shoulder c is formed just where the body of the mold joins the stem a. If one of these molds is dipped into the composition, it assumes the appearance shown in Fig. 3, and if now the upper part or neck b is cut off and the capsule withdrawn from the mold the capsule assumes the appearance shown in Figs. 4 and 6. The upper end presents a level and even surface, which allows of closing the capsule very readily.

The ordinary manner of closing the capsules after they are charged is by pasting on their mouths small disks d, cut out of a plate previously made from the same composition from which the capsules are made, and when ready they present an uneven surface, as clearly shown in Fig. 10 of the drawings, which shows a central section of a capsule made according to the old style. Instead of this I place the capsules after having them withdrawn from the molds into sticks B, with a series of holes d, the mouth of each capsule being turned up. Thus arranged the capsules can readily be filled by means of a suitable syringe, and if now the mouth of each capsule is temporarily closed by the application of a drop of gum or of the composition constituting the body of the capsules the the stick B can be turned upside down and dipped into the composition, and in a very short time the whole series of capsules is firmly closed, and their appearance when thus finished is that of a regular ellipsoid without seam and with an even surface throughout, as shown in Fig. 7. By these means the manufacture of the capsules of copaiba is greatly facilitated, and a cheaper and better article can be produced at less cost than by the old method.

Having thus fully described my invention, what I claim as new, and desire to secure by Letters Patent, is—

1. The arrangement of the shoulder c on the mold A, as and for the purpose shown and described.

2. Dipping the capsules A after they have been charged into some suitable composition, as described, for the purpose of closing them and to produce an even and seamless surface.

P. CAUHAUPÉ.

Witnesses:
 NATHANIEL BISHOP,
 JAMES WALLACE.